United States Patent [19]

Iossi et al.

[11] Patent Number: 5,009,494
[45] Date of Patent: Apr. 23, 1991

[54] WIDE FIELD ALL-REFLECTIVE MULTIPLE FIELD OF VIEW TELESCOPE

[75] Inventors: Daryl R. Iossi, Torrance; Lacy G. Cook, El Segundo; Alfred Koppensteiner, Torrance, all of Calif.

[73] Assignee: Hughes Aircraft Company, Los Angeles, Calif.

[21] Appl. No.: 525,801

[22] Filed: May 21, 1990

[51] Int. Cl.[5] .................. G02B 17/06; G02B 7/18; G02B 26/10; G02B 15/00
[52] U.S. Cl. .......................... 350/620; 350/505; 350/1.2; 350/559
[58] Field of Search ............. 350/559, 505, 504, 620, 350/619, 442, 443, 1.2, 1.1, 6.22

[56] References Cited

U.S. PATENT DOCUMENTS

| | | | |
|---|---|---|---|
| 3,554,628 | 1/1971 | Kennedy | 350/1.2 |
| 3,631,248 | 12/1971 | Johnson | 350/443 |
| 3,674,334 | 7/1972 | Offner | 350/620 |
| 3,790,247 | 2/1974 | Korsch | 350/619 |
| 4,199,217 | 4/1980 | Rogers | 350/1.2 |
| 4,265,510 | 5/1981 | Cook | 350/505 |
| 4,804,258 | 2/1989 | Kebo | 350/505 |
| 4,812,030 | 3/1989 | Pinson | 350/505 |
| 4,834,517 | 5/1989 | Cook | 350/505 |
| 4,934,805 | 6/1990 | Pinson | 350/620 |

*Primary Examiner*—Jon W. Henry
*Attorney, Agent, or Firm*—William J. Streeter; Wanda K. Denson-Low

[57] ABSTRACT

An all-reflective multiple field of view optical system has first (10) and second (12) reflecting assemblies sharing a common packaging volume in a single unit which are movable with respect to one another to provide multiple fields of view utilizing a common entrance pupil region (14) and viewing plane (16).

20 Claims, 3 Drawing Sheets

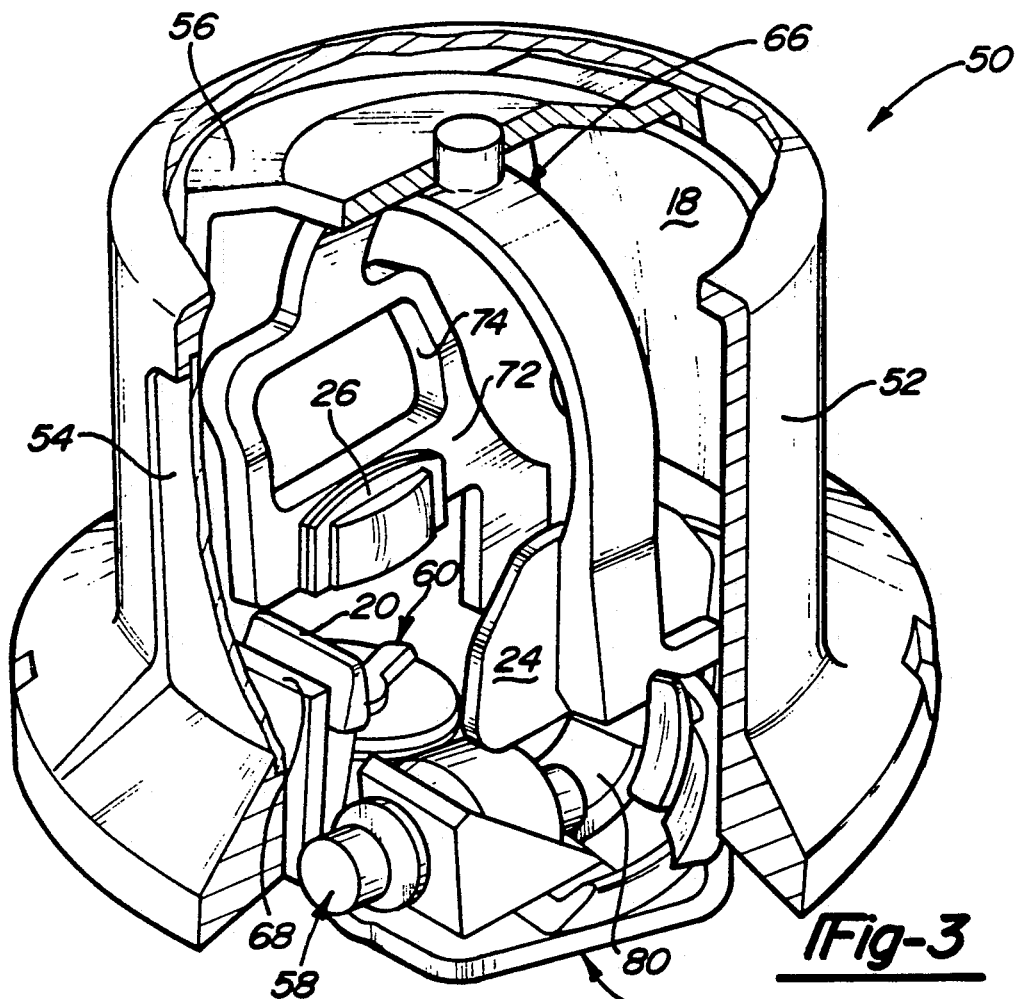
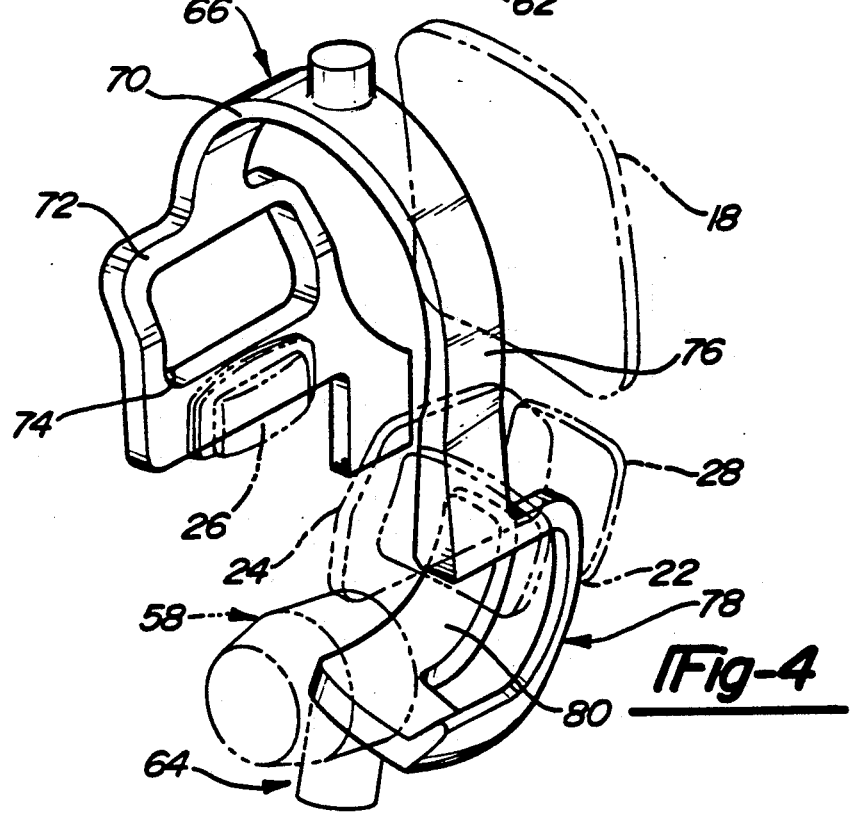

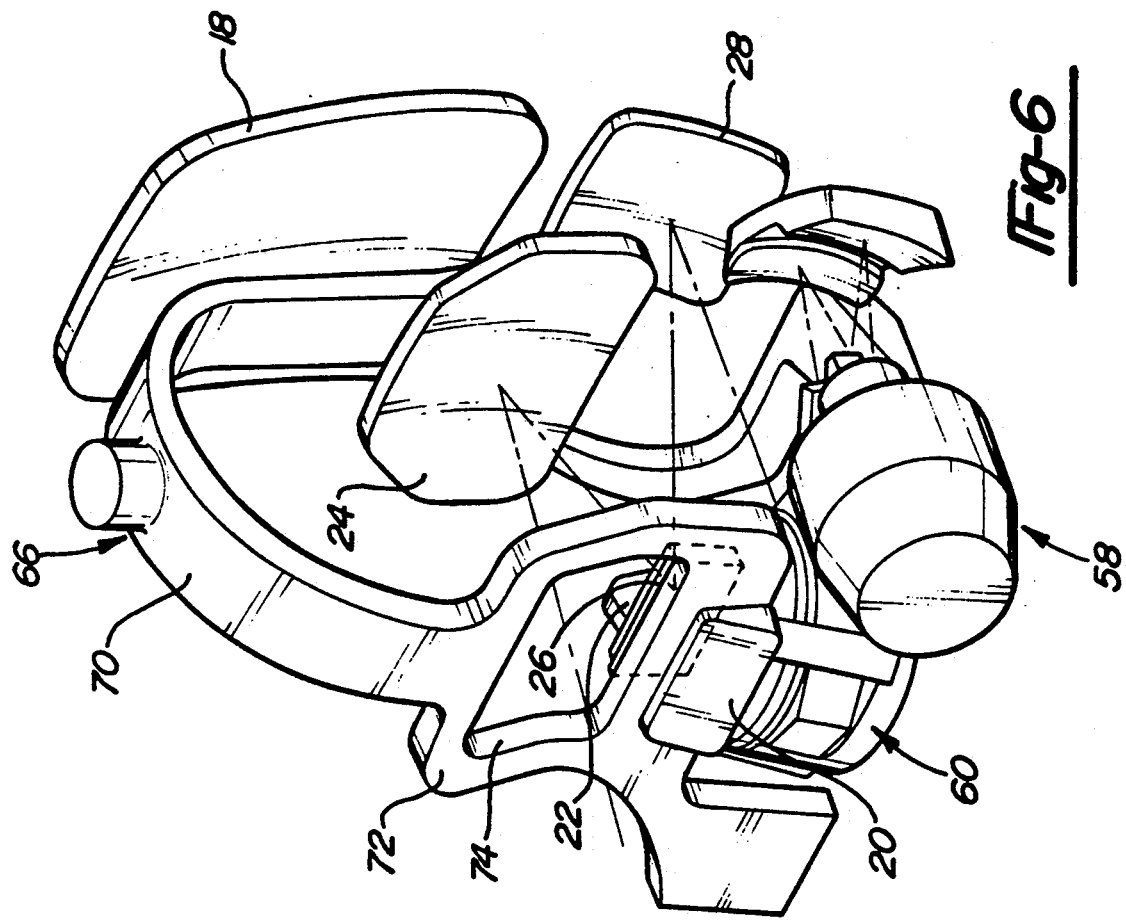
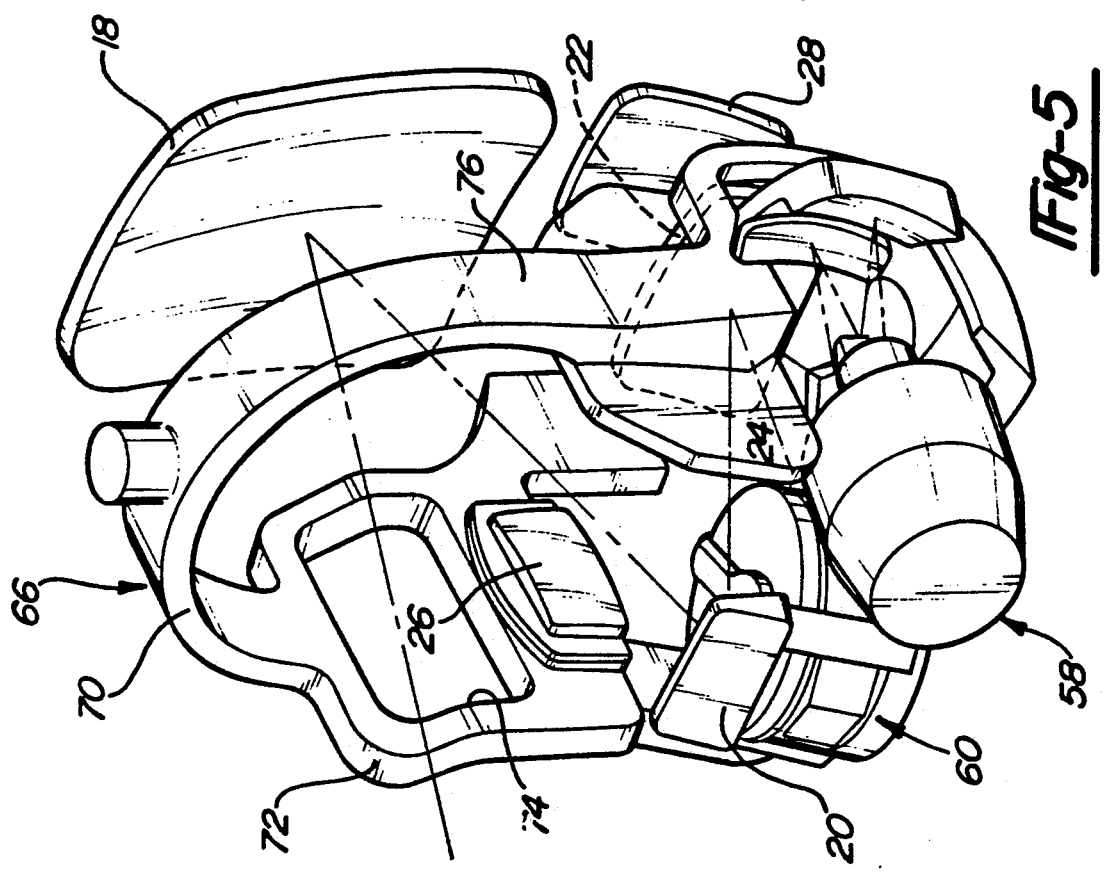

WIDE FIELD ALL-REFLECTIVE MULTIPLE FIELD OF VIEW TELESCOPE

BACKGROUND

1. Technical Field

This invention relates to reflective telescope systems and, more particularly, to an all-reflective multiple field of view optical system.

2. Discussion

When viewing a distant object through a telescope system, the observer is commonly interested in performing two separate and sequential functions. The first of these functions is a coarse search over a large field of view for the purposes of locating or acquiring previously undetected objects. The second function is the fine examination over a smaller field of view for purposes of identification or discrimination of the previously located object.

A number of three-mirror anastigmat telescopes which have different magnifications have been designed and implemented in the past. These designs, however, have been typically only implemented with a single field of view. An example of this type of system is illustrated in U.S. Pat. No. 3,674,334, issued July 4, 1972 to Offner, entitled "Catoptric Anastigmatic Afocal Optical System". Typically, in order to achieve a multiple field of view system, two or more telescopes are used. Each of the telescopes has its own separate and distinct entrance aperture region, optical path, packaging volume, and imaging plane. These configurations take up an enormous amount of space and/or volume. Hence, there is a desire for a system which minimizes the space requirements by sharing a common volume and provides a multiple field of view system.

Also, refractive telescope systems have been utilized in whole or in part. Refractive optical systems generally have one or more of the following disadvantages. Refractive systems generally have spectral limitations and chromatic aberrations. Refractive systems have size limitations, lens material limitations and a lack of radiation hardness. Further, the refractive systems are more sensitive to thermal changes and are exceptionally heavy when used in large aperture designs.

SUMMARY OF THE INVENTION

According to the teachings of the present invention, a system is provided which retains the versatility and benefits of reflective optics while eliminating the disadvantages of refractive optical systems. The present invention provides a single telescope with a pair of three-mirror anastigmats which may be moved with respect to one another to provide a multiple field of view optical system. Generally, the telescope system will include a lower magnification, coarser resolution, wider field of view extreme to enable search and acquisition functions during operation of the system. Also, the system will include a higher magnification, finer resolution and narrower field of view to enable tracking and detailed imaging during operation of the system.

The present invention provides the art with an all-reflective afocal telescope which exhibits substantially unobscured aperture and field capabilities. A multiple field of view operation in a single housing body to minimize the space and components necessary in an optical system is provided by the invention. The present invention provides for correction of spherical aberration, coma and astigmatism while providing a flat field of view. Both of the reflective systems of the invention utilize common entrance pupil regions and a common exit pupil. Imaging optics of a scanning or staring variety are generally placed behind the exit pupil to provide a final image plane.

In the preferred embodiment, the reflective multiple field of view optical system includes an entrance pupil region, first and second assemblies for reflecting light from a viewed object, and a viewing plane. The first and second reflecting assemblies are movably positioned with respect to one another such that in a first position, one of the reflecting assemblies reflects light from the entrance pupil to the plane for viewing. In the second position, the other of the reflecting assemblies reflects light to the plane for viewing. The field of view and the afocal magnification of the first and second reflecting assemblies are different.

BRIEF DESCRIPTION OF THE DRAWINGS

The various advantages of the present invention will become apparent to those skilled in the art after a study of the following specification and by reference to the drawings in which:

FIG. 3 is a perspective view, partially in cross-section, of a mechanical implementation of the telescope design schematically shown in FIGS. 1 and 2;

FIG. 4 is a perspective view of a yoke used in the implementation of FIG. 3;

FIG. 5 is a perspective view of the yoke and reflecting assemblies in a first position; and FIG. 6 is a perspective view of the yoke and reflecting assemblies in a second position.

DESCRIPTION OF THE PREFERRED EMBODIMENT

Figure 1:
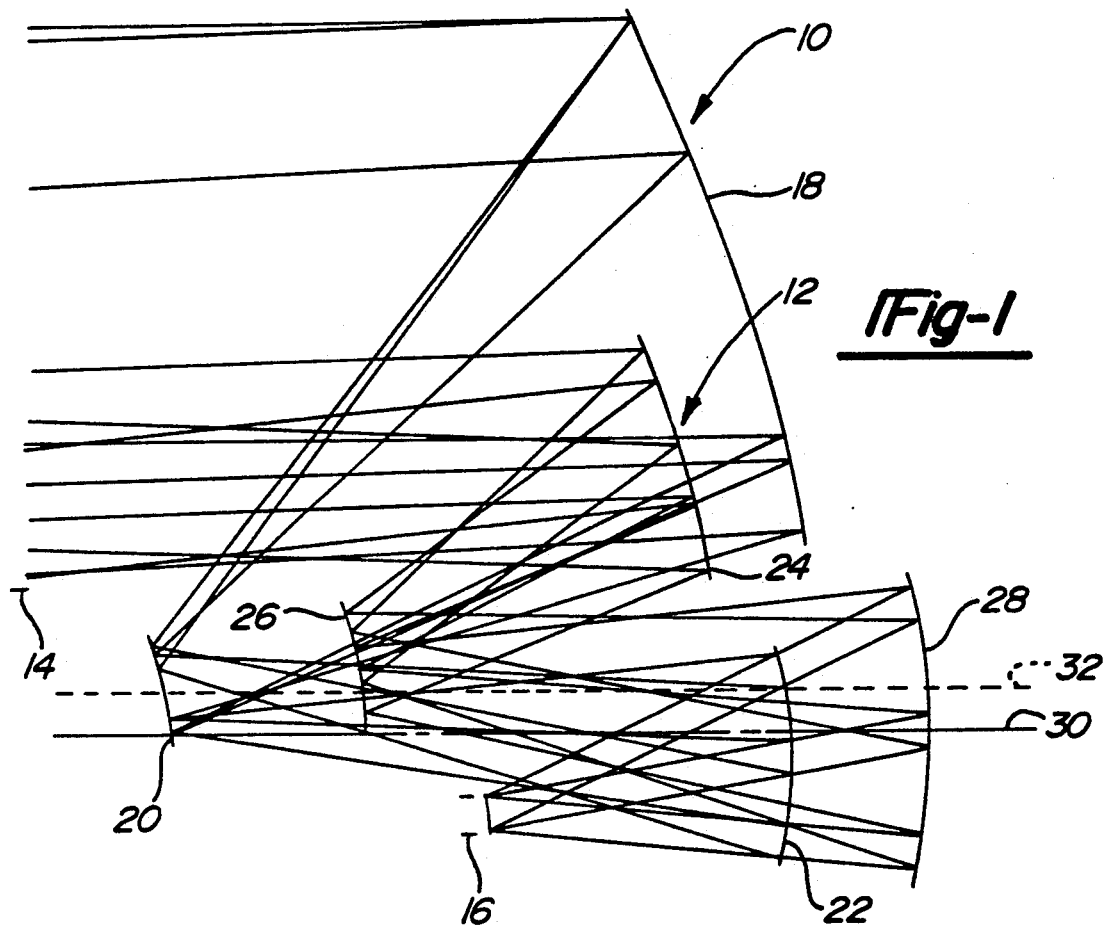
FIG. 1 is a schematic view of an elevation view of an apparatus made in accordance with the teachings of the present invention.
Figure 2:
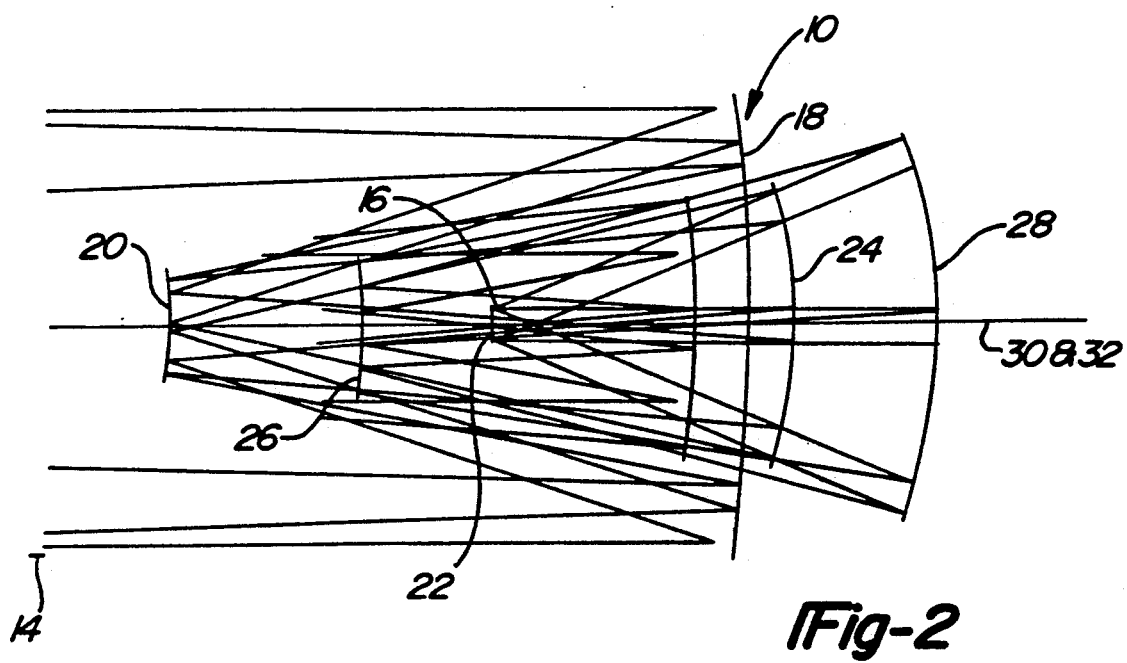
FIG. 2 is a schematic diagram of an azimuth view of the apparatus of FIG. 1.

Referring to FIGS. 1 and 2, an afocal optical system is shown including a first 10 and a second 12 reflecting assembly. The system also includes an entrance pupil region 14 and an exit pupil 16. The first reflecting assembly 10 is comprised of a primary 18, secondary 20 and tertiary 22 mirror. Likewise, the second reflecting assembly 12 is comprised of a primary 24, secondary 26 and tertiary 28 mirror.

The primary mirror 18 of the first reflecting assembly 10 includes a central axis 30 defining the system optical axis. The primary mirror 18 is fixably or stationarily positioned with respect to the optical axis. The primary mirror 18 is a positive power mirror and may be a paraboloid conic or higher order aspheric mirror.

The secondary mirror 20 is a negative power mirror and is positioned such that it is in a Cassegrain-like configuration with the primary mirror 18. The secondary mirror is fixably positioned off-axis with respect to the optical axis 30. The secondary mirror 20 may be a hyperboloid conic or higher order aspheric mirror.

The tertiary mirror 22 is a positive power mirror. The tertiary mirror is movably positioned such that it is off-axis with respect to the optical axis of the system. The tertiary mirror 22 may be a paraboloid conic or higher order aspheric mirror.

The first reflecting assembly 10 generally performs a narrow field of view operation. The narrow field of view provides high magnification, finer resolution and smaller field of view enabling tracking and detailed imaging during operation of the optical system.

The primary mirror 24 of the second reflecting assembly 12 is movably positioned and includes a central axis 32 defining the system optical axis. The primary mirror 24 is a positive power mirror and may be a paraboloid conic or higher order aspheric mirror.

The secondary mirror 26 of the second reflecting assembly 12 is a negative power mirror and is positioned such that it is in a Cassegrain-like configuration with the primary mirror 24. The secondary mirror 26 is movably positioned off-axis of the system. The secondary mirror 26 may be a hyperboloid conic or higher order aspheric mirror.

The tertiary mirror 28 is a positive power mirror. The tertiary mirror 28 is fixably positioned off-axis with respect to the system. The tertiary mirror 28 may be of a spherical shape conic or higher order aspheric mirror.

The second reflecting assembly 12 generally performs a wide field of view operation. The wide field of view provides a lower magnification, coarser resolution, larger field of view extreme to enable search and acquisition functions during operation of the optical system.

Generally, the above mirrors can be machined using precision diamond turning techniques which provide for high optical transmission. Also, the precision machining enables fewer total parts and the use of relatively inexpensive materials when compared to refractive elements.

The second reflecting assembly 12 mirrors are positioned such that one or more of the mirrors may be movable with respect to the first reflective assembly 10. The movability or pivotinq of one or more of the mirrors of the second reflecting assembly 12 enables the telescope to be compact and the second reflecting assembly 12 to pivot 90° with respect to the first reflecting assembly 10. This pivoting of 90° enables one or more of the mirrors of the second assembly 12 to be positioned out of the line of sight of the first reflecting assembly 10 and, therefore, enables the light to pass from the object being viewed through the first reflecting assembly 10. Once it is desirable to utilize the second reflecting assembly 12, the mechanism can be moved or pivoted so that the second reflecting assembly mirrors are aligned for viewing the object to be viewed. The system generally utilizes the common entrance pupil region 14 and common exit pupil 16.

A specific prescription for the system in accordance with the present invention as illustrated in FIGS. 1 and 2 is as follows:

TABLE 1

OPTICAL PRESCRIPTION OF A SPECIFIC EMBODIMENT OF OPTICAL SYSTEM OF THE PRESENT INVENTION

| # | Description | Radius | Conic Constant | Thickness | Decenter | Tilt |
|---|---|---|---|---|---|---|
| 10 | First Reflective Assembly | | | | | |
| 18 | Primary Mirror | −16.584 | −1.0033 | −7.072 | 0 | 0 |
| 20 | Secondary Mirror | −3.359 | −3.1905 | 6.735 | 0.016 | 0.621 |
| 22 | Tertiary Mirror | −4.612 | −0.8690 | −3.317 | 0.251 | 4.105 |
| 16 | Exit Pupil | ∞ | 0 | 0 | −0.571 | 10.000 |
| 12 | Second Reflective Assembly | | | | | |
| 24 | Primary Mirror | −10.187 | −1.0312 | −3.913 | 0 | 0 |
| 26 | Secondary Mirror | −3.810 | −5.4260 | 6.136 | 0.034 | 1.954 |
| 28 | Tertiary Mirror | −6.138 | −0.8039 | −4.826 | 0.699 | 8.717 |
| 16 | Exit Pupil | ∞ | 0 | 0 | −1.057 | 10.000 |

[(+) Thickness are to the right;
(+) Radii have centers to the right
(+) Decenters are up
(+) Tilts are counterclockwise
Decenters are done before tilting
Tilt units are degrees]

TABLE 2

OPTICAL CHARACTERISTICS OF A SPECIFIC EMBODIMENT OF OPTICAL SYSTEM OF THE PRESENT INVENTION

| # | Description | Afocal Magnification | Field of View | Exit Pupil Diameter | Field of View Offset |
|---|---|---|---|---|---|
| 10 | First Reflective Assembly | 12.96× | 2.5° × 3.7° | 0.378 | 0.477° |
| 12 | Second Reflective Assembly | 4.32× | 7.5° × 11.1° | 0.378 | 0.477° |

Moving to FIGS. 3 through 6, a mechanical implementation of the present invention is illustrated. In these figures, the two reflecting assemblies 10 and 12 are illustrated within a hardware package or sensor head assembly 50. The head assembly 50 includes a casing 52 and window 54. The window 54 enables light to pass to the optical system from the object being viewed.

Positioned within the casing 52 is a main optical housing 56, a detector dewar 58, a scanner 60, an imager housing assembly 62, switching motor mechanism 64 and the reflecting assembly switching assembly 66. The main optical housing 56 includes a viewing aperture 68 serving as an entrance pupil region to enable light from the object being viewed to pass into the reflecting assemblies of the optical system.

The switching assembly 66 generally includes a yoke member 70. The yoke member 70 is U-shaped and includes an enlarged portion 72 at one end of one of the legs of the yoke 70, as seen in FIG. 4. A viewing aperture 74 is formed in the enlarged portion 72 and serves as the entrance pupil when the wide field of view mode of the telescope is utilized, as seen in FIG. 6. Also, the enlarged portion 72 serves as a mounting surface for the secondary mirror 26 of the second reflecting assembly 14, as seen in FIGS. 3-5.

The other leg 76 of the U-shaped yoke member 70 includes a mounting surface for the primary mirror 24 of the second reflective assembly 12. Also, a U-shaped member 78 extends from the leg 76 to enable coupling of the yoke with the switching motor mechanism through a gear train or the like. The member 78 also includes a projecting member 80 for mounting of the tertiary mirror 22 of the first reflecting assembly 10, as seen in FIG. 4. Thus, the movable mirrors are mounted on the yoke 70.

The fixed or stationary mirrors are mounted in a manner as now will be described. The primary mirror 18 of the first reflecting assembly 10 is fixably mounted to the optical housing 56. The second mirror 20 of the first reflective assembly 10 is fixably mounted to the optical housing 56 above the scanner 60, as seen in FIG. 5. Also, the tertiary mirror 28 of the second reflecting assembly 12 is fixably mounted on the housing 56.

In a first position, as seen in FIG. 5, the first reflective assembly 10 receives light from an object being viewed. The light from the object being viewed passes through the window 54, passes the viewing aperture 68 in the optical housing 56 and to the primary mirror 18. The beams of light are reflected from the primary mirror 18 to the secondary mirror 22 and to the tertiary mirror 24. The beams of light from the tertiary mirror 24 are reflected into the scanner 60 and imaging assembly 62 until the ultimate image is produced. In this arrangement, the yoke member 70 is transverse to or out of alignment with the beams of light, as illustrated in FIG. 5.

The yoke member is rotated 90° by the motor 64 of the switching assembly 66. Generally, a two-position precision hardened index stopping mechanism (not shown) provides for the switching of the yoke 70 from the narrow field of view position to the wide field of view position. The motor 64 drives the yoke 70 until it is in alignment with the beams of light, as illustrated in FIG. 6. At this point, light passes through the window 54, through the housing viewing aperture 68 and through the yoke viewing aperture 74. The beams of light contact the primary mirror 24 and are reflected to the secondary mirror 26 and to the tertiary mirror 28. As mentioned above, the beams of light are then reflected to the scanner 60 and the imaging assembly 62.

The movable field of view mirrors include the primary 24 and secondary 26 mirrors of the second reflecting assembly 12, and also the tertiary 22 mirror of the first reflecting assembly 10. The first reflecting assembly tertiary mirror 22 is the least sensitive element of the first reflecting assembly, permitting rotation in and out of position for field of view change without inducing unacceptable foresight errors.

The second reflecting assembly primary 24 and secondary 26 mirrors are co-mounted on the yoke 70 preserving close tolerances. The second reflective assembly tertiary mirror 28 is the least sensitive element of this field of view system and, therefore, can be mounted on the main housing 56 separately from the primary 24 and secondary 26 mirrors.

The assembly accomplishes field of view mode change in less than one second and allows repetitive foresight to less than 0.1 mrad in the first reflecting assembly mode or the narrow field of view mode while retaining less than 5 mrads shift in the second reflecting assembly mode or the wide field of view foresight from the first reflecting assembly field of view.

The present invention has several advantages over conventional three-mirror astigmatic optical systems. The present invention uses an all-reflective system, providing a plurality of fields of view. The present invention enables the reflective assemblies to be positioned in nested configurations with the mirrors of one assembly being moved in and out of the line of sight of the beams to provide more than one field of view. The invention minimizes the space requirements for multi-field of view systems.

It should be understood that while this invention has been described in connection with the particular examples hereof, that various modifications, alterations and variations of the disclosed preferred embodiment can be made after having the benefit of the study of the specification, drawings and the subjoined claims.

What is claimed is:

1. An all reflective multiple field of view optical system comprising:
    an entrance pupil region;
    first reflecting means for reflecting light from a viewed object passing through said entrance pupil region to a plane for viewing; and
    second reflecting means for reflecting light from a viewed object passing through said entrance pupil region to said plane for viewing, said first or second reflecting means being an afocal three mirror anastigmat, said first and second reflecting means being movably positioned with respect to one another such that in a first position said first reflecting means or said second reflecting means is reflecting light passing through said entrance pupil region to said plane for viewing and in a second position the other of said first or second reflecting means is reflecting light to said plane for viewing wherein fields of view and afocal magnification of said first and second reflecting means are different.

2. The all-reflective multiple field of view optical system according to claim 1 wherein said first and second reflecting means cooperate with one another in a spacial relationship such that said first and second reflecting means are selectively operable with respect to one another.

3. The all-reflective multiple field of view optical system according to claim 1 wherein said first reflecting means is said afocal three-mirror anastigmat.

4. The all-reflective multiple field of view optical system according to claim 1 wherein said second reflecting means is said afocal three-mirror anastigmat.

5. The all-reflective multiple field of view optical system according to claim 3 wherein said first reflecting means afocal three-mirror astigmat is an off-axis system.

6. The all-reflective multiple field of view optical system according to claim 4 wherein said second reflecting means afocal three-mirror astigmat is an off-axis system.

7. An all-reflective multiple field of view optical system comprising:
    an entrance pupil region;
    a first reflecting assembly including a three-powered-mirror anastigmat system having a primary mirror with a central axis, a secondary mirror facing said primary mirror such that light from a viewed object is reflected by said secondary mirror, and a tertiary mirror positioned to receive light from said secondary mirror such that said tertiary mirror reflects an image of the object being viewed to a plane for viewing;

a second reflecting assembly including a three powered mirror anastigmat system including a primary mirror having a central axis, a secondary mirror facing said primary mirror such that light from a viewed object is reflected by said secondary mirror, and a tertiary mirror positioned to receive light from said secondary mirror such that said tertiary mirror reflects an image of the object being viewed to said plane for viewing; and said first and second reflecting assemblies being movably positioned with respect to one another such that in a first position one of said three-mirror anastigmats reflects light from said entrance pupil region to said viewing plane and in a second position the other of said three-mirror anastigmats reflects light to said plane for viewing, wherein the fields of view and afocal magnification of said first and second reflecting assembly three-mirror anastigmats are different.

8. The all-reflective multiple field of view optical system according to claim 7 wherein said primary mirrors have positive powers.

9. The all-reflective multiple field of view optical system according to claim 7 wherein said secondary mirrors have negative powers.

10. The all-reflective multiple field of view optical system according to claim 7 wherein said tertiary mirrors have positive powers.

11. The all-reflective multiple field of view optical system according to claim 7 wherein said three-mirror anastigmats are afocal.

12. The all-reflective multiple field of view optical system according to claim 7 wherein said three-mirror anastigmats are off-axis.

13. A sensor head assembly comprising:
a casing including means for enabling light to pass into said casing; and
means for mounting a first and second reflecting means, said first or second reflecting means being an afocal three mirror anastigmat, said mounting means positioned within said casing to enable said first and second reflecting means to be movably positioned with respect to one another wherein in a first position said first reflecting means or said second reflecting means is reflecting light passing through said light passage means to a plane for viewing and in a second position the other of said first or second reflecting means is reflecting light to said plane for viewing wherein fields of view and afocal magnification of said first and second reflecting means are different.

14. The sensor head according to claim 13 wherein said mounting means is further comprised of an optical housing having an opening enabling light to pass and a switching assembly movably coupled with said optical housing, said first and second reflecting means coupled with said optical housing and said switching assembly.

15. The sensor head according to claim 14 wherein said switching assembly further comprising a U-shaped yoke member coupled with a motor assembly for moving said yoke member.

16. The sensor head according to claim 14 wherein said first reflecting means is said afocal three-mirror anastigmat, the mirrors of said three-mirror anastigmat being coupled with said optical housing and said switching assembly.

17. The sensor head according to claim 14 wherein said second reflecting means is said afocal three-mirror anastigmat, the mirrors of said three-mirror anastigmat being coupled with said optical housing and said switching assembly.

18. The sensor head according to claim 13 further comprising a detector means positioned within said casing and associated with said first and second reflecting means.

19. The sensor head according to claim 13 further comprising a scanning means positioned within said casing and associated with said first and second reflecting means.

20. The sensor head according to claim 13 further comprising an imaging means positioned within said casing and associated with said first and second reflecting means.

* * * * *